(12) United States Patent
Matsukawa et al.

(10) Patent No.: US 8,169,794 B2
(45) Date of Patent: May 1, 2012

(54) HARNESS-INTEGRATED SLIDE HINGE AND SLIDING-TYPE ELECTRONIC APPARATUS

(75) Inventors: Takashi Matsukawa, Sakura (JP); Yuuki Tanaka, Sakura (JP); Tomoyuki Shinohara, Kohtoh-ku (JP); Shigeru Ashida, Kohtoh-ku (JP); Yasushi Nakagawa, Klongluang District (TH); Shou Ueda, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/775,921

(22) Filed: May 7, 2010

(65) Prior Publication Data

US 2010/0214760 A1 Aug. 26, 2010

Related U.S. Application Data

(63) Continuation of application No. PCT/JP2008/070436, filed on Nov. 10, 2008.

(30) Foreign Application Priority Data

Nov. 14, 2007 (JP) ................................. 2007-295700

(51) Int. Cl.
*H01B 7/08* (2006.01)
(52) U.S. Cl. ............... 361/826; 174/117 F; 174/117 FF; 455/575.4
(58) Field of Classification Search .................. 361/749, 361/826; 174/268, 117 F; 455/575.4
See application file for complete search history.

(56) References Cited

U.S. PATENT DOCUMENTS

| 4,874,908 A * | 10/1989 | Johansson .................... 174/72 A |
| 5,834,701 A * | 11/1998 | Saka et al. .................. 174/117 F |
| 6,413,103 B1 * | 7/2002 | Merz et al. ....................... 439/98 |
| 6,501,020 B2 * | 12/2002 | Grant et al. ...................... 174/50 |
| 6,528,731 B2 * | 3/2003 | Murakami et al. .......... 174/117 F |
| 6,544,057 B1 * | 4/2003 | Stremick et al. .............. 439/162 |
| 6,973,186 B2 * | 12/2005 | Shin .......................... 379/433.12 |
| 7,541,542 B2 * | 6/2009 | Park et al. ................. 174/102 R |
| 7,626,642 B2 * | 12/2009 | Lee ............................... 348/837 |
| 7,934,947 B2 * | 5/2011 | Matsukawa et al. .......... 439/502 |
| 8,063,310 B2 * | 11/2011 | Matsukawa et al. ....... 174/117 F |
| 2003/0213610 A1 * | 11/2003 | Ide et al. ..................... 174/117 F |
| 2005/0077074 A1 * | 4/2005 | Tanaka ........................ 174/117 F |
| 2008/0185168 A1 * | 8/2008 | Matsukawa et al. ....... 174/117 F |
| 2010/0093207 A1 * | 4/2010 | Matsukawa et al. .......... 439/502 |
| 2010/0243293 A1 * | 9/2010 | Tanaka ........................ 174/117 F |

FOREIGN PATENT DOCUMENTS

| JP | 2007-036515 A | 2/2007 |
| JP | 2007-288436 A | 11/2007 |
| JP | 2008-210583 A | 9/2008 |
| WO | 2007/136040 A1 | 11/2007 |

* cited by examiner

*Primary Examiner* — Dameon Levi

(74) *Attorney, Agent, or Firm* — Sughrue Mion, PLLC

(57) ABSTRACT

A harness-integrated slide hinge is provided that connects between a plurality of casings having circuits therein while allowing the casings to move relatively. The harness-integrated slide hinge includes: a first sliding plate fitted to the one casing; a second sliding plate fitted to the other casing; a sliding mechanism that connects between the first sliding plate and the second sliding plate while allowing them to move relatively; and a harness that has a plurality of wirings, and connection sections provided on both ends of these wirings, and that is routed between the first sliding plate and the second sliding plate, wherein a wiring lamination section having a plurality of the wirings laminated therein is bent in a U-shape and accommodated in a space section between the first sliding plate and the second sliding plate.

11 Claims, 6 Drawing Sheets

HARNESS-INTEGRATED SLIDE HINGE AND SLIDING-TYPE ELECTRONIC APPARATUS

TECHNICAL FIELD

The various embodiments described herein relate to an improvement in a sliding hinge, in particular, to a sliding hinge with an integrated harness and a sliding-type electronic apparatus that uses this.

This application claims priority under 35 U.S.C. §119 from Japanese Patent Application No. 2007-295700, filed on Nov. 14, 2007, the contents of which are incorporated herein by reference.

BACKGROUND ART

In general, in an electronic apparatus formed with two or more connected casings, a flexible printed circuit (hereunder referred to as an FPC) is used as a wiring for electrical connection between the casings.

For example, in an electronic apparatus such as a sliding-type mobile phone in which two casings slide mutually with respect to one another, wiring formed with an FPC is generally used. Here, the wiring to be applied to a sliding-type structure requires horizontal bending within an extremely narrow space in the height direction (conventionally 3 mm) between the casings of the sliding hinge, and flexing resistance for approximately 10,000 or more bending cycles. The FPC is used because it has a high level of bendability even in a narrow bending space.

However, in order to further reduce the thickness of electronic apparatus, such as a mobile phone, there is commercially available a sliding hinge having an approximately 2 mm space in the height direction between the casings, to be used in sliding-type electronic apparatus.

In such a thin sliding hinge, as shown in FIG. 5, an FPC 103 is arranged on sides 101a and 102a, which are outer surfaces of the casings, along the outsides of casings 101 and 102, rather than being bent in the height direction H of an inner space between the casings 101 and 102 of a sliding hinge 100. While thereby ensuring a minimum bend radius required for bending the FPC, there has been a problem in that it is difficult to further reduce the thickness of the entire sliding unit including the sliding hinge and the FPC used as a wiring for electrical connection.

Moreover, functionality and performance of electronic apparatuses such as mobile phones are increasingly improving, and consequently improved transmission characteristics and noise resistance characteristics are being required in the electrical connection wiring. However, the FPC has a disadvantage of having a poor noise resistance since a plurality of signal lines are fixed by a resin film or the like, and each of the signal lines is therefore not shielded.

Consequently, to replace the FPC, micro-coaxial cables, which have excellent transmission characteristics and noise resistance characteristics, are used. However, micro-coaxial cables have poorer flexing compared to the FPC, and application thereof is therefore limited to: a so-called clamshell type open/close structure shown in FIG. 6A; a so-called jackknife type rotation structure shown in FIG. 6B; and a so-called twist type biaxial structure shown in FIG. 6C that performs rotation as well as opening/closing. In contrast, in a sliding-type electronic apparatus as shown in FIG. 6D, micro-coaxial cables can not be applied as a simple form of replacement of the FPC.

On the other hand, JP 2007-036515 discloses a coaxial cable connecting structure that uses coaxial cables that can be applied to a sliding-type electronic apparatus. That is to say, the coaxial cable connecting structure disclosed in patent document 1 is such that inter-substrate wiring between two slidable substrates is configured with a plurality of coaxial cables, these coaxial cables are bound at both end sections thereof, and a portion of the intermediate section that is not bound is accommodated as a surplus length between the substrates. In this case, the coaxial cables of the intermediate section are not bound, and therefore each of the coaxial cables can be freely bent, and mechanical reliability of the inter-substrate wirings can be ensured.

However, in this coaxial cable connecting structure disclosed in JP 2007-036515, the coaxial cables bend in the height direction between the substrates as mentioned above. Therefore, there is a need for ensuring a space in the height direction between the substrates so as to ensure a bending radius of the coaxial cables. Consequently, it has been difficult to reduce the thickness of the sliding unit.

For the above reasons there has been a demand for a sliding unit capable of meeting space-saving needs while having excellent transmission characteristics and noise resistance characteristics, particularly for electronic apparatus having two casings that can freely mutually slide on each other.

DISCLOSURE OF THE NON-LIMITING EMBODIMENTS

Problems to be Solved by the Invention

Taking the above problems into consideration, it is an aspect of the various non-limiting embodiments of the present application to provide a thin harness-integrated slide hinge, having excellent transmission characteristics and noise resistance characteristics, and a sliding-type electronic apparatus that uses this. While the non-limiting embodiments may solve the problems identified above, various aspects of these non-limiting embodiments are not directed to those problems and need not solve these problems.

Means for Solving the Problems

In order to solve the above problems and achieve the relevant aspects, the various non-limiting embodiments of the present invention employ the following.

(1) A harness-integrated slide hinge having a sliding hinge that connects between a plurality of casings having circuits therein while allowing the casings to move relatively. The harness-integrated slide hinge includes: a first sliding plate fitted to the one casing; a second sliding plate fitted to the other casing; a sliding mechanism that connects between the first sliding plate and the second sliding plate while allowing them to move relatively; and a harness that has a plurality of wirings, and connection sections provided on both ends of these wirings, and that is routed between the first sliding plate and the second sliding plate. A wiring lamination section having a plurality of the wirings laminated therein is bent in a U-shape and accommodated in a space section between the first sliding plate and the second sliding plate.

According to the harness-integrated slide hinge disclosed in (1) above, the wiring lamination section having a plurality of the wirings that form the harness laminated therein is bent in a U shape, and therefore it can be accommodated in a narrow space section between the first sliding plate and the second sliding plate. As a result, a thin harness-integrated slide hinge can be provided.

Moreover, the wirings are accommodated in the space section between the first sliding plate and the second sliding plate that serve as the casings of the sliding hinge. Therefore the wirings do not rub against other components during the sliding movement, and connection reliability thereof is consequently improved.

Furthermore, since the sliding hinge and the harness are integrated, handling during the assembly of the sliding-type electronic apparatus becomes easier, thereby improving productivity.

Moreover, the wirings do not need to bend in the height direction of the space section, but bend in the widthwise direction of the space section. Consequently, even wiring with poor flexing characteristics can be applied to the harness-integrated slide hinge.

(2) According to another limiting embodiment the respective wirings are a flat cable in which a plurality of micro-coaxial cables arranged parallel to each other is coated together with a resin coating material and the wiring lamination section is accommodated in the space section so that the respective micro-coaxial cables are arranged along a direction in which the first sliding plate and the second sliding plate oppose each other.

In the case of (2) above, since the wirings that form the harness are a flat cable formed with the micro-coaxial cables that are coated together, a thin harness-integrated slide hinge having excellent transmission characteristics and noise resistance characteristics can be provided.

Moreover, since the micro-coaxial cables are arranged in the space section along the direction in which the first sliding plate and the second sliding plate oppose each other, the micro-coaxial cables can bend in the widthwise direction of the space section, and the first sliding plate and the second sliding plate can prevent crossing over of the adjacent flat cables.

(3) According to another non-limiting embodiment an opening section for taking out the connection sections is formed in one or both of the first sliding plate and the second sliding plate.

In the case of (3) above, according to the position of the circuit provided in the casing of the sliding-type electronic apparatus, it is possible to make the connection sections provided on both of the end sections of the harness face the outside from an arbitrary location of each sliding plate.

(4) Additionally, in the non-limiting embodiments described above, one or both of the first sliding plate and the second sliding plate is formed from a metallic material or a metal containing material.

(5) The non-limiting embodiments may also include a shield member that is provided in one or both of the first sliding plate and the second sliding plate and that is formed from a metallic material or a metal containing material.

In the case of (4) and (5) above, it is possible to increase the shielding effect for the connection section of the harness.

(6) According to another non-limiting embodiment, a sliding-type electronic apparatus is such that by means of the abovementioned harness-integrated slide hinge, a plurality of casings having circuits therein are fitted together while allowing them to move relatively, and the circuits in the respective casings are electrically connected to each other.

According to the sliding-type electronic apparatus disclosed in (6) above, since the aforementioned harness-integrated slide hinge is used, a thin sliding-type electronic apparatus having excellent transmission characteristics and noise resistance characteristics can be provided.

Aspects of the Non-Limiting Embodiments

As described above, according to the harness-integrated slide hinge of the various non-limiting embodiments described herein, it is possible to provide a thin harness-integrated slide hinge having excellent transmission characteristics and noise resistance characteristics. Moreover, it is also possible to provide a sliding-type electronic apparatus that uses these features.

| | Description of the Reference Symbols |
|---|---|
| 1 | Sliding unit (harness-integrated slide hinge) |
| 2 | First sliding plate |
| 3 | Second sliding plate |
| 2a, 3a | Main surface section |
| 4 | Sliding mechanism |
| 5 | Snap operation member (torsion spring) |
| 6 | Harness |
| 6a | Cable section |
| 6b | Lamination section (wiring lamination section) |
| 7 | Flat cable |
| 8, 9 | Connection section |
| 10 | Micro-coaxial cable |
| 11 | Sheath (coating material) |
| 21 | Sliding-type electronic apparatus |
| 22 | Lower casing (casing) |
| 23 | Upper casing (casing) |

BEST MODE FOR CARRYING OUT THE INVENTION

Figure 1A:
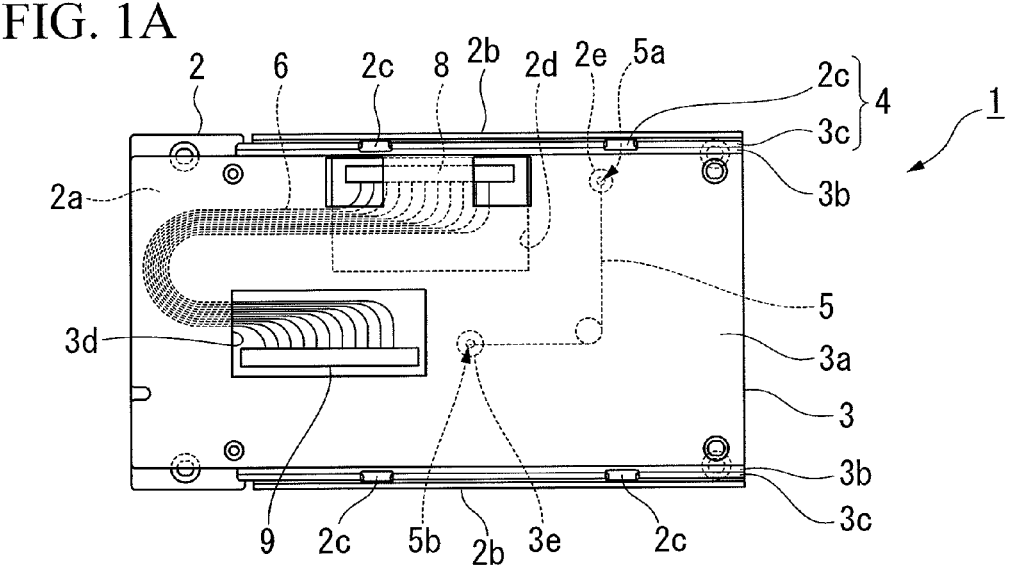
FIG. 1A is a plan view of a harness-integrated slide hinge according to a non-limiting embodiment, before being slid.
Figure 1B:
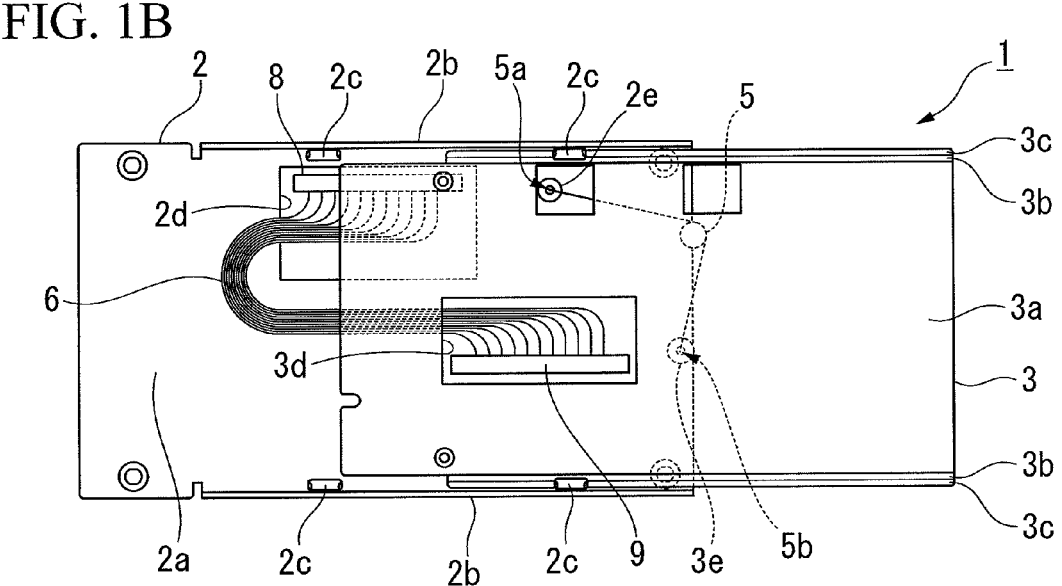
FIG. 1B is a plan view of the harness-integrated slide hinge according to the non-limiting embodiment, after being slid.
Figure 1C:
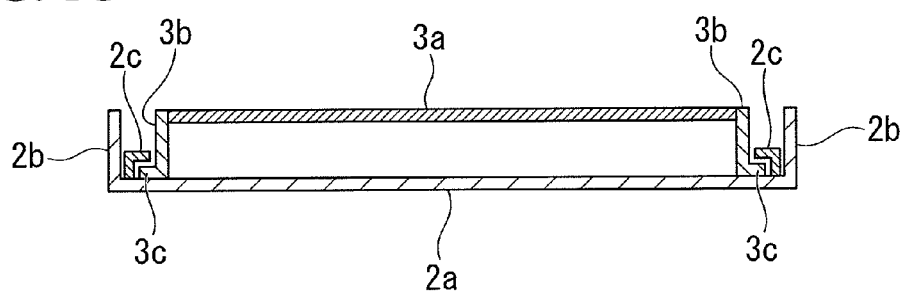
FIG. 1C is a side view of the harness-integrated slide hinge according to the non-limiting embodiment of FIGS. 1A and 1B.

Hereunder, a non-limiting embodiment is described with reference to the drawings. FIG. 1A to FIG. 1C are drawings showing a harness-integrated slide hinge according to the non-limiting. FIG. 2A to FIG. 2C and FIG. 3A to FIG. 3B are drawings showing a harness 6 for electronic apparatus wiring. FIG. 4 is a perspective view showing a sliding-type electronic apparatus. The following drawings FIG. 1A to FIG. 4 are for describing a configuration of the non-limiting embodiment. The size, thickness, dimensions, and so forth of each section shown in the drawings may differ from the dimensional relationship in an actual harness-integrated slide hinge, and sliding-type electronic apparatus.

First there is described a configuration of a sliding hinge 1 with integrated harness (hereunder, referred to as sliding unit 1). The sliding unit 1, as shown in FIG. 1A to FIG. 1C, schematically comprises: a first sliding plate 2 and a second sliding plate 3 that form a casing of the sliding unit 1; a sliding mechanism 4 that connects the first sliding plate 2 and the second sliding plate 3 while allowing them to move relatively to each other (hereunder, referred to as "slide"); a snap operation member 5 that enables a snap operation when the sliding plates 2 and 3 are slid; and a harness 6 for electronic apparatus wiring (hereunder, referred to as harness 6). The first sliding plate 2 and the second sliding plate 3 are fitted so as to mutually slide, via the sliding mechanism 4, along the lengthwise direction of the sliding unit 1. That is to say, they are configured so that mutual reciprocating sliding is possible with a stroke from a state shown in FIG. 1A where the first sliding plate 2 and the second sliding plate 3 are completely superposed, to a state shown in FIG. 1B where the first sliding plate 2 and the second sliding plate 3 are partially superposed. Hereunder, each configuration is described in detail.

The first sliding plate 2 comprises; a main surface section 2a, bent sections 2b standing upright from both widthwise edges of the main surface section 2a, and claw sections 2c notched up from the main surface section 2a, in the vicinity of the bent parts between the main surface section 2a and the bent sections 2b. The second sliding plate 3 comprises; a main surface section 3a, side surface sections 3b standing upright from both widthwise edges of the main surface section 3a, and flange sections 3c bent from the edges of the side surface sections 3b.

The sliding mechanism 4, as shown in FIG. 1C, comprises the claw sections 2c of the first sliding plate 2, and the flange sections 3c of the second sliding plate 3. Each claw section 2c is notched up from the main surface section 2a, and its free end faces inward in the widthwise direction of the first sliding plate 2. Each flange section 3c projects outward in the widthwise direction of the main surface section 3a, and engages with the claw sections 2c so as to allow mutual sliding of the first sliding plate 2 and the second sliding plate 3.

The sliding unit 1 is such that the main surface sections 2a and 3a of the respective sliding plates 2 and 3 are superposed so as to oppose each other. Between the main surface sections 2a and 3a there is provided a space section with a height corresponding to the height of the side surface section 3b. The snap operation member 5 and the harness 6 are accommodated within this space section. The harness 6 is bent in a U shape and accommodated in the space section. The height of the side surface section 3b (that is, the height of the space section) is, for example, approximately 2 mm, and the width between the side surfaces 3b (that is, the width of the space section) is, for example, approximately several of ten millimeters.

In the first sliding plate 2 and the second sliding plate 3 there are respectively formed opening sections 2d and 3d, through which it is possible to take out connectors 8 and 9, described later, to the outside. As a result it is possible to connect one connector 8 of the harness 6 to a connector connection section of one casing of a sliding-type electronic apparatus, described later, and it is possible to connect the other connector 9 to a connector connection section of the other casing. The position, range, and size (hereunder, referred to as position and so forth) of the opening sections 2d and 3d for the first sliding plate 2 and the second sliding plate 3 may be arbitrarily set according to the positions of connector sections provided in the casings of the sliding-type electronic apparatus, to which the hinge unit 1 is fitted. The opening section is not limited to being formed in both of the first sliding plate 2 and the second sliding plate 3, and it may be formed in either one of the first sliding plate 2 and the second sliding plate 3.

The first sliding plate 2 and the second sliding plate 3 may be formed using a metallic material such as stainless steel (SUS) or aluminum. The apparatus may also be configured such that on the surface of the first sliding plate 2 and the second sliding plate 3 there is fitted a shield member such as a plate or mesh made of the abovementioned metallic material. As a result the shield effect of micro-coaxial cables 10 described later may be further increased while signal noise generated from the micro-coaxial cables 10 may be shielded. The metallic shield is not limited to being formed on both of the first sliding plate 2 and the second sliding plate 3, and it may be formed on either one of the first sliding plate 2 and the second sliding plate 3.

For the snap operation member 5, as shown in FIGS. 1A to 1C, a torsion spring 5 may be used. By means of this torsion spring 5, the respective sliding plates 2 and 3 are connected as described below.

One end 5a of the torsion spring has a tip end section thereof rotatably fitted to a supporting section 2e that is provided on the main surface section 2a of the first sliding plate 2 on the second sliding plate 3 sliding direction of the opening section 2d. The other end 5b of the torsion spring has a tip end section thereof rotatably fitted to a supporting section 3e that is provided on the main surface section 3a of the second sliding plate 3 on the sliding direction of the opening section 3d.

In the present non-limiting embodiment, in a state with the torsion spring 5 fitted to the respective sliding plates 2 and 3, the torsion spring 5 forms a V shape with the one end 5a and the other end 5b thereof being sufficiently distanced from each other, in the state shown in FIG. 1A where the respective sliding plates 2 and 3 are superposed, and in the state shown in FIG. 1B where the respective sliding plates 2 and 3 have been slid.

Moreover, in the case where for the sliding direction of the sliding unit 1, the direction of sliding of the sliding plate 3 with respect to the sliding plate 2 is taken as the extending direction, and the opposite direction is taken as the returning direction, the torsion spring 5 is accommodated in a space section between the main surface sections 2a and 3a so that the torsion part of the torsion spring 5 is on the extending direction side of the harness 6.

The sliding mechanism 5 of the present non-limiting embodiment is not particularly limited to having a torsion spring, and may be any suitable mechanism that connects the first sliding plate 2 and the second sliding plate 3 while enabling them to snap-operate.

Figure 2A:
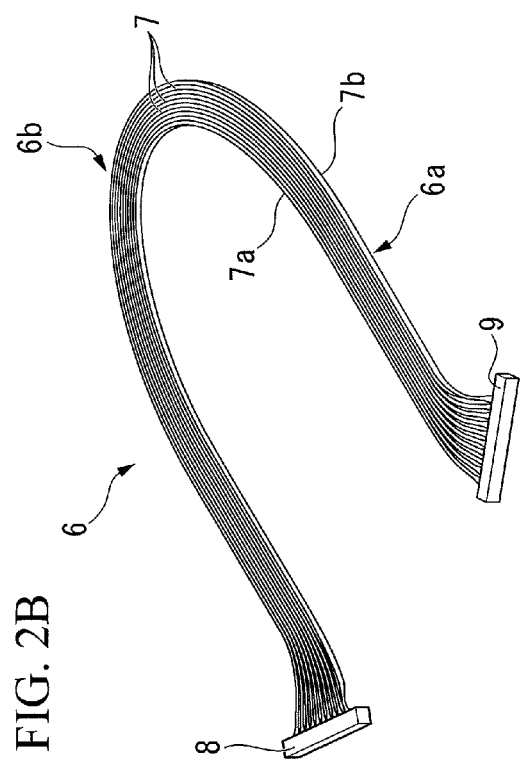
FIG. 2A is a plan view of a harness according to the non-limiting embodiment.
Figure 2B:
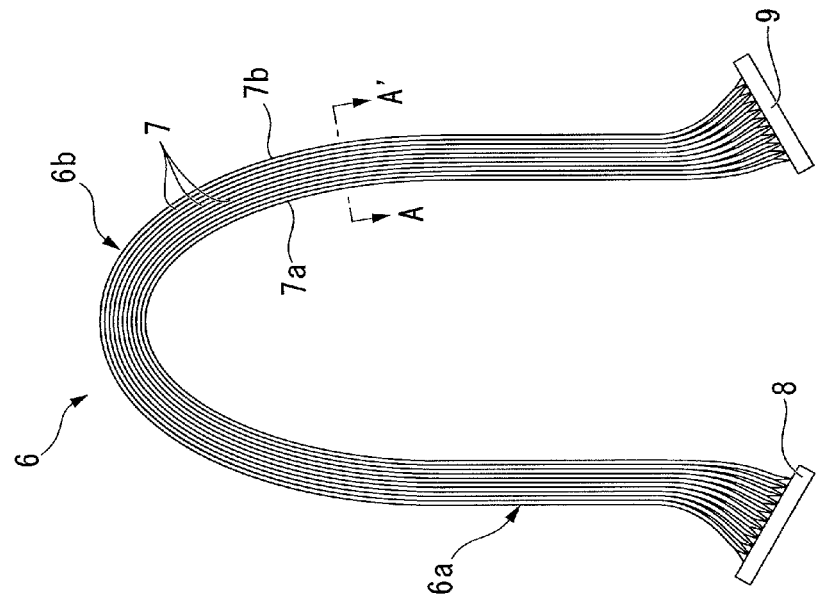
FIG. 2B is a perspective view of the harness according to the non-limiting embodiment.
Figure 2C:
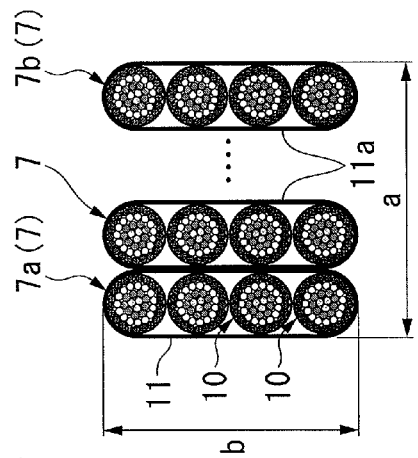
FIG. 2C is a schematic view of a section on line A-A' in FIG. 2A.

The harness 6, as shown in FIG. 2A to FIG. 2C, is schematically configured with a plurality of flat cables 7 and a pair of the connectors 8 and 9. The harness 6 is such that the plurality of flat cables 7 is laminated, and the respective connectors 8 and 9 are connected to opposite end sections thereof. The harness 6, as shown in FIG. 1A to FIG. 1C, is accommodated in the space section between the main surface sections 2a and 3a so as to be on the returning direction with respect to the torsion spring 5. Furthermore a cable section 6a is accommodated in the space section in a state of being bent in a substantially U shape when seen in a horizontal plane, and so that the cable section 6a is on the returning direction with respect to the connectors 8 and 9. In the case where the first sliding plate 2 and the second sliding plate 3 are mutually slid, the connectors 8 and 9 move in a direction of moving away from each other in the sliding direction. At this time, the cable section 6a can simultaneously deform and follow the movement of the connectors 8 and 9.

The torsion spring 5 and the harness 6, due to their above-mentioned mutual positional relationship in the space section, and due to the mutual positional relationship between the torsion part of the torsion spring 5 and the cable section 6a, may be configured to as not to interfere with each other in the respective states of before and after sliding, and during a sliding operation.

As shown in FIG. 2C, the flat cable 7 comprises four substantially sectionally circular micro-coaxial cables 10, and a sheath (coating material) 11 that coats the outer periphery of the four micro-coaxial cables 10. Since the four circular micro-coaxial cables 10 are coated all together, the sectional shape of the sheath 11 becomes a racing-track shape, and outer surfaces 11a of a pair of straight line portions become substantially flat surfaces. In the harness 6, as shown in FIG. 2A and FIG. 2B, the respective flat cables 7 are laminated with the flat outer surfaces 11a thereof in contact with each other, thereby forming a lamination section (wiring lamination section) 6b. As a result, in the space section, the four micro-coaxial cables 10 that form each of the flat cables 7 are arranged in a row of four along the lamination direction. That is to say, the lamination section 6b is accommodated within the space section, so that the micro-coaxial cables 10 are arranged in line along the direction in which (the main surface section 2a of) the first sliding plate 2 and (the main surface section 3a of) the second sliding plate 3 oppose each other.

In the present non-limiting embodiment, the number of the micro-coaxial cables 10 is not particularly limited, and it may be between several cables and several tens of cables according to the relationship with the height of the accommodating section. Moreover, in the present non-limiting embodiment, a configuration with only the micro-coaxial cables 10 is shown. However, the configuration of the present non-limiting embodiment is not limited to this, and the flat cable 7 may be configured with a combination of cables other than coaxial cables such as a power supply cable and an optical cable combined with the micro-coaxial cables.

As shown in FIG. 1A to FIG. 1C, the cable section 6a is bent in a substantially arc shape on the lengthwise returning direction side of the sliding unit 1. At this time, as shown in FIG. 2A to FIG. 2C, the cable section 6a is bent such that among the plurality of laminated flat cables 7, a flat cable 7a on one end in the lamination direction is present on the inner most circumferential side of the arc, and a flat cable 7b on the other end in the lamination direction is present on the outer most circumferential side of the arc. Moreover the entire harness 6 having the cable section 6a bent in an arc shape in this way, is accommodated within the space between the main surfaces 2a and 3a. The bend radius of the flat cable 7 in this case becomes a maximum for the flat cable 7b on the outer most circumferential side of the arc, and becomes a minimum for the flat cable 7a on the inner most circumferential side of the arc. The bend radius of the flat cable 7b on the outer most circumferential side of the arc becomes, when maximum, approximately half the width of the space section. The bend radius of the flat cable 7a on the inner most circumferential side of the arc is equivalent to the remaining of the bend radius of the flat cable 7b on the outer most circumferential side after deduction of the lamination thickness of the flat cable. In either case, the bend radius of the flat cable 7 in a state of being fitted in the sliding unit 1 is determined by the width of the space section. The bent shape of the cable section 6a is not limited to a shape bent at a constant curvature radius, and the curvature radius may continuously change. In the case where the first sliding plate 2 and the second sliding plate 3 slide on each other, the bent shape of the cable section 6a deforms.

In the vicinity of the connectors 8 and 9 of the cable section 6a, the distance between the adjacent flat cables 7 is comparatively wider. On the other hand, in the lamination section 6b, the distance between the adjacent flat cables 7 is comparatively narrower, and the adjacent flat cables 7 are partially in tight contact with each other. Furthermore, as mentioned above, the sectional shape of the flat cable 7 is of a racing-track shape, and the width thereof in the direction in which the four micro-coaxial cables 10 are arranged is wider than the width in the direction orthogonal thereto. Consequently, each of the laminated flat cables 7 cannot go across the adjacent cable, and the order of the cable arrangement in the vicinity of the connectors 8 and 9 is the same as that of the cable arrangement of the lamination section 6b. Moreover, since the width in the direction of the arrangement of the micro-coaxial cables 10 is greater than the width in the direction orthogonal thereto, the harness 6 has flexibility in the direction orthogonal to the direction of the arrangement of the micro-coaxial cables 10, and the flexibility is not compromised even in the lamination section 6b.

Figure 3A:
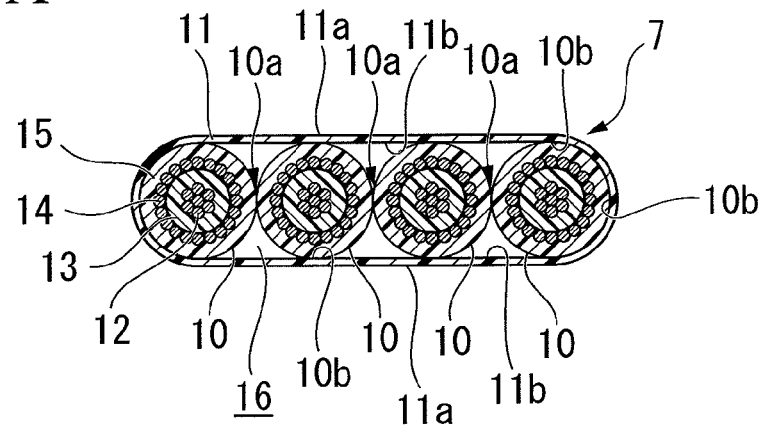
FIG. 3A is a schematic view of a section of a flat cable.
Figure 4:
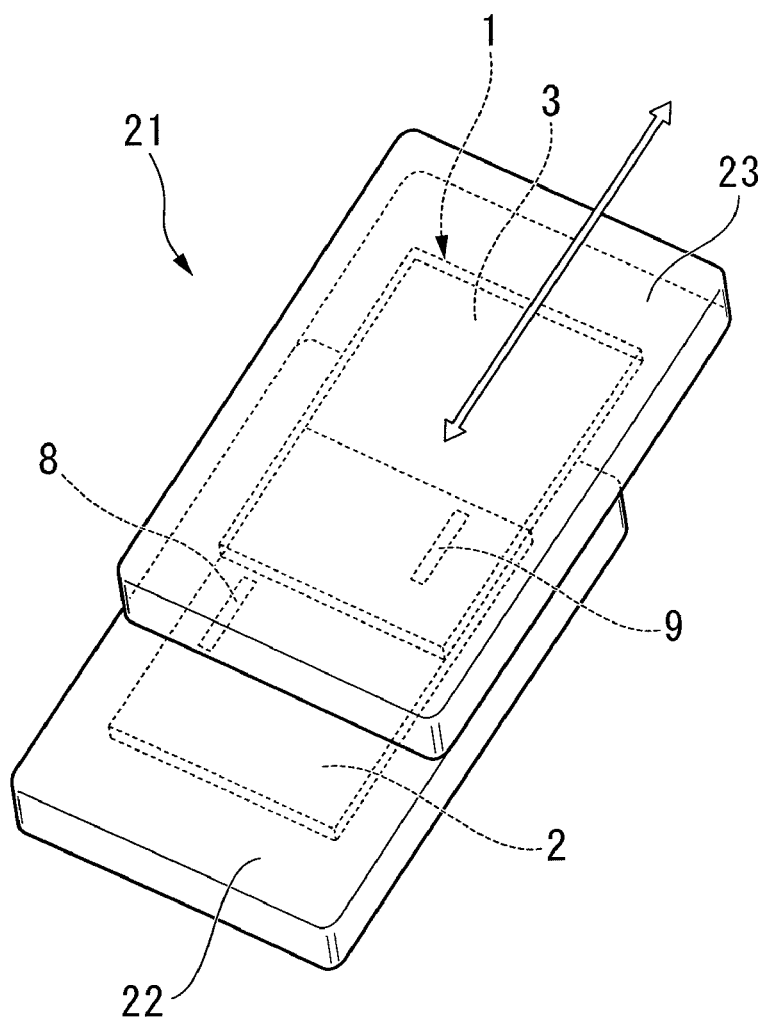
FIG. 4 is a perspective view showing a sliding-type electronic apparatus to which the harness-integrated slide hinge according to the non-limiting embodiment has been applied.
Figure 5:
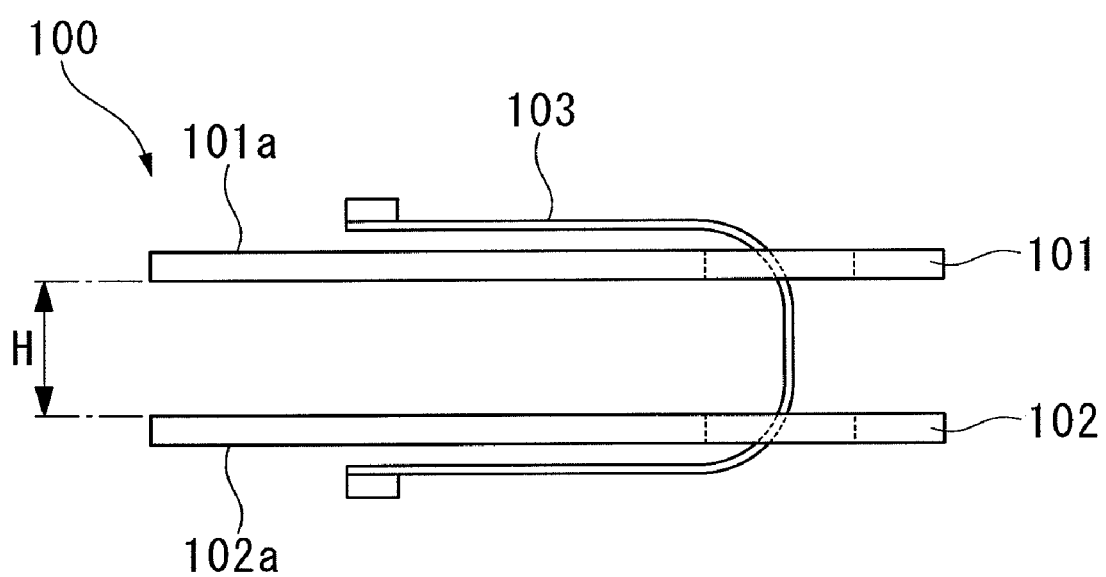
FIG. 5 is a side view showing a wiring structure of a sliding-type electronic apparatus that uses a FPC as an intercasing wiring material.
Figure 6A:
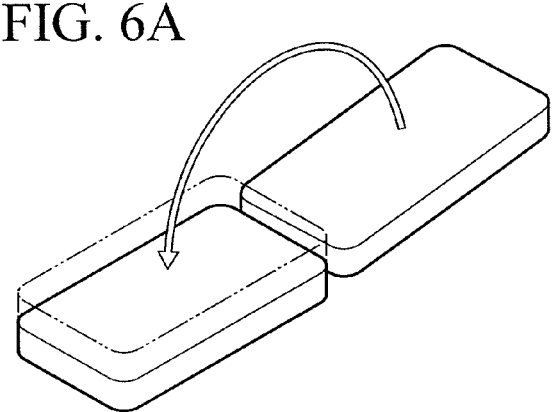
FIG. 6A is a drawing showing an example of a casing movement mode of a mobile phone as an example of an electronic apparatus.
Figure 6B:
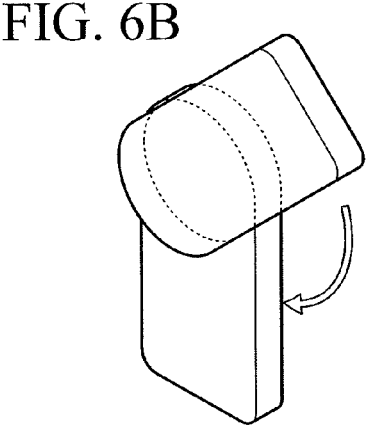
FIG. 6B is a drawing showing an example of a casing movement mode of a mobile phone as an example of an electronic apparatus.
Figure 6C:
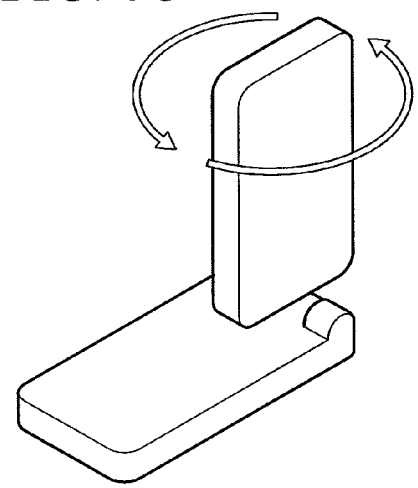
FIG. 6C is a drawing showing an example of a casing movement mode of a mobile phone as an example of an electronic apparatus.
Figure 6D:
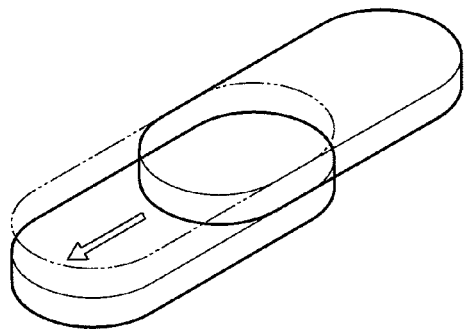
FIG. 6D is a drawing showing an example of a casing movement mode of a mobile phone as an example of an electronic apparatus.

As shown in FIG. 3A, the micro-coaxial cable 10 comprises; a center conductor 12, an inner insulating layer 13 that surrounds the center conductor 12, an external conductor 14 that further surrounds the inner insulating layer 13, and an outer coating (hereunder, referred to as a jacket) 15 that further surrounds the external conductor 14. The type of the micro-coaxial cable 10 in use and the combination of winding directions of the external conductor 14 are not particularly limited. However, preferably the size of the center conductor 12 is no more than AWG (American wire gauge) #36, and more may be a cable within the range of AWG#42 to 50. The material of the inner insulating layer 13 is not particularly limited, however a fluorine resin material may be used, and PFA (tetraethylene/fluoro-perfluoro-alkyl-vinyl-ether copolymer; melting point 300° C.) is also acceptable.

The sheath 11 is such that the sectional shape thereof is of a racing-track shape, and the surface of a pair of straight line portions forming the racing-track shape is such that the outer surface 11a and an inner surface 11b are both flat. Furthermore the shape of the micro-coaxial cable 10 is not transferred to the surface of the outer surface 11a. At a contact section 10a between the adjacent micro-coaxial cables 10, the micro-coaxial cables 10 are in contact with each other, but the jackets 15 are not fused to each other.

The sheath 11 restricts the micro-coaxial cables 10 from moving across the adjacent cables. Moreover, at a contact section 10b between the sheath 11 and the micro-coaxial cables 10, the sheath 11 and the jacket 15 are in contact with each other, but the resins thereof are not fused to each other.

In the present non-limiting embodiment, resin or the like that forms the sheath 11 is not filled in between the sheath 11 and the micro-coaxial cables 10, and a gap section 16 is present therebetween. However, the non-limiting present embodiment is not limited to this, and a resin or the like that improves the flexibility and flexing durability of the flat cable 7 may be filled within the gap section 16.

The material of the sheath 11 is not particularly limited. However, an ultraviolet curing resin or fluorocarbon resin, or the like may be used, and ETFE (melting point 225° C.) is also acceptable. A fluorocarbon resin has a low melting point and can be easily formed thin. Moreover it may be helpful if the frictional resistance of the outer surface 11a and the inner surface 11b of the sheath 11 is low, and hence the abovementioned flexibility of the flat cable 7 is not impeded.

Table 1 shows the results of a comparison between the characteristics of PFA and ETFE. As shown in Table 1, ETFE is superior in tensile strength and tensile extensibility compared to PFA. Therefore, by using ETFE for the sheath material, it is possible to thinly coat the flat cable 7 while improving the mechanical characteristic thereof over PFA. The method of coating the sheath 11 is not particularly limited. However, in the non-limiting embodiment four of the micro-coaxial cables 10 are arranged in parallel and collectively coated by means of extrusion molding. As a result it becomes possible to have the micro-coaxial cables 10 in a flat cable form. The thickness of the sheath 11 is not particularly limited and may be in the range of 10 to 50 μm and a range of 20 to 30 μm is also acceptable. If the thickness of the sheath 11 is in a range of 10 to 50 μm, sufficient flexibility can be ensured in the flat cable 7, and hence this thickness is may be beneficial.

TABLE 1

| | Units | ETFE | PFA |
| --- | --- | --- | --- |
| Melting point | deg C. | 225 | 302-310 |
| Tensile strength | MPa | 38 | 29 |
| Tensile extensibility | % | 420 | 390 |

In the present non-limiting embodiment, the difference in melting points of the resin that forms the sheath 11 and the resin that forms the jacket 15 is not less than 30° C., and more preferably not less than 50° C. If the difference in melting points is not less than 30° C., the sheath 11 may be selectively cut away with use of a carbon dioxide laser or the like.

Therefore, just the sheath 11 can be cut away and peeled off without fusing the contact section 10b between the sheath 11 and the jacket 15. In the case of using ETFE for the sheath 11, the sheath 11 can be cut away even if the carbon dioxide laser output is small. Therefore it may aid to ensure operational safety and cost reduction.

Figure 3B:
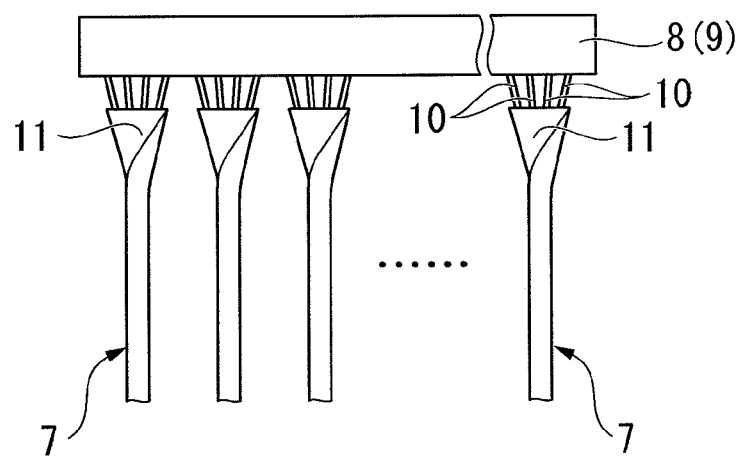
FIG. 3B is a plan view of a connecting part of a connector.

The connection section of the flat cable 7 and the connectors 8 and 9 is such that as shown in FIG. 3B, the sheath 11 is peeled off and the micro-coaxial cables 10 are exposed. Consequently, it becomes easier for each of the micro-coaxial cables 10 to move, and it becomes easier to align the wiring intervals of the micro-coaxial cables 10 with the pitch of the terminals of the connectors 8 and 9. The width of the exposed micro-coaxial cable 10 is approximately 3 mm. The flat cable 7 is twisted and connected to the connectors 8 and 9 so that the arrangement direction of the micro-coaxial cables 10 connected to the connectors 8 and 9, and the arrangement direction of the micro-coaxial cables 10 within the flat cable 7 in the lamination section 6b, are orthogonal to each other.

The method of exposing the micro-coaxial cable 10 by cutting away the sheath 11 is typical in the case of connecting to the connectors 8 and 9. However in the present non-limiting embodiment, it is not limited to this, and an arbitrary cable portion of the flat cable 7 may be cut away in an arbitrary region, and the sheath 11 cut away. In the portion where the sheath 11 is cut away, the micro-coaxial cables 10 are exposed from the surface of the cable portion, and hence the individual micro-coaxial cables 10 are easily moved. Consequently, the exposed portion may be applied to a cable hinge or the like, and the flexing characteristic of the flat cable 7 can be improved.

Next, the sliding operation of the sliding unit 1 of the present non-limiting embodiment is described.

FIG. 1A shows a state where the casing of the sliding unit of the present non-limiting embodiment is closed, and FIG. 1B shows a state where the casing is slid.

In the state shown in FIG. 1A, if the second sliding plate 3 is manually slid with respect to the first sliding plate 2, the one end 5a and the other end 5b of the torsion spring 5 come closer to each other. Therefore the torsion portion deforms in the tightening direction and the elastic force is accumulated increasingly. The elastic force of the torsion spring 5 becomes a maximum in a state where the positions of the respective supporting sections 2e and 3e of both of the ends 5a and 5b of the torsion spring 5 are lined up widthwise in a direction orthogonal to the sliding direction. If the second sliding plate 3 slides further beyond this state, the accumulated elastic force of the torsion spring 5 causes the second sliding plate 3 to rapidly and automatically slide until it reaches the sliding position of the second sliding plate 3, giving the sliding position shown in FIG. 1B. In the present non-limiting embodiment, the design is such that the state of the torsion portion of the torsion spring 5 in FIG. 1A becomes substantially the same as the state in FIG. 1B.

Moreover, also when sliding the second sliding plate 3 from the state in FIG. 1B, the torsion portion returns to the state in FIG. 1A through the same process.

In the sliding operation of the sliding unit 1, in the case where the first sliding plate 2 and the second sliding plate 3 slide on each other, the harness 6 is such that the connectors 8 and 9 move in the direction in which they move away from each other or move closer to each other along the sliding direction. At this time, the cable section 6a simultaneously deforms and follows the movement of the connectors 8 and 9.

Next is described a sliding-type electronic apparatus to which the sliding unit 1 of the present non-limiting embodiment is applied. A sliding-type electronic apparatus 21, as shown in FIG. 4, schematically comprises; a lower casing 22, an upper casing 23, and the sliding unit 1. To the lower casing 22 and the upper casing 23 are respectively fitted the first sliding plate 2 and the second sliding plate 3 of the sliding unit 1, and they can mutually slide via this sliding unit 1.

The casings 22 and 23 are respectively provided with a connector connection section (not shown in the drawing) that serves as an input/output section of a circuit section. Moreover the one connector 8 of the harness 6 is connected to the connector connection section (not shown in the drawing) of the lower casing 22, and the other connector 9 is connected to the connector connection section (not shown in the drawing) of the upper casing 23. Thereby, the respective circuit sections of these two casings 22 and 23 are electrically connected via the sliding unit 1.

As described above, according to the sliding unit 1 of the present non-limiting embodiment, even if the height (height of the space section) of the side surface 3b is 2 mm, the sliding unit 1 having the micro-coaxial cable 10 applied therein can be provided. That is to say, the sliding unit 1 enables implementation of the micro-coaxial cables 10, and hence the transmission characteristics and noise resistance characteristics thereof can be improved compared to those using the conventional FPC as a wiring material between the casings.

Moreover, according to the sliding unit 1 of the present non-limiting embodiment, a thin sliding unit 1 can be provided that is suitable for wiring of the sliding-type electronic apparatus 21.

The harness 6 is capable of retaining the arrangement order of the micro-coaxial cables 10, and can be accommodated in the space section with a height of 2 mm.

Furthermore, according to the harness 6 of the present non-limiting embodiment, the arrangement direction of the micro-coaxial cables 10 in the vicinity of the connectors 8 and 9, and the arrangement direction in the lamination section 6*b* is changed by 90°. Therefore, as with the case where the conventional FPC is used as the wiring material between the casings, the micro-coaxial cables 10 do not require a bending radius in the space section with a height of 2 mm, and a curvature radius greater than an allowable bending radius can be made in the widthwise direction of the space section. As a result, the requirement of 10,000 or more bending cycles required for a mobile phone can be met.

According to the sliding-type electronic apparatus 21 of the present non-limiting embodiment, since the sliding unit 1 is applied, the sliding operation and electrical connection can be realized in a space-saving manner. Consequently, the sliding-type thin electronic apparatus 21 can be provided.

As described above, according to the harness-integrated slide hinge (sliding unit) 1, it is possible to provide the thin sliding hinge 1 with integrated harness (sliding unit 1) having excellent transmission characteristics and noise resistance characteristics, and the sliding-type electronic apparatus 21 that uses this.

The technical scope of the present invention is not limited to the above non-limiting embodiment, and various modifications may be possible without departing from the scope of the present invention.

For example, when making the micro-coaxial cables 10 into a flat cable form, they may be made into a flat cable form by plain-knitting with resin tapes or resin fibers instead of using a resin sheath.

Moreover, according to the position and orientation of the opening sections of the first sliding plate 2 and the second sliding plate 3, the harness 6 may be configured with flat cables of equal length, or may be configured with flat cables of unequal length.

A harness-integrated slide hinge of the non-limiting embodiment is a sliding hinge that supports a plurality of casings having circuits therein while allowing them to move relatively, and comprises: a first sliding plate fitted to the casing on one side; a second sliding plate fitted to the casing on the other side; a sliding mechanism that supports the first sliding plate and the second sliding plate while allowing them to move relatively; and a harness that has a plurality of wirings, and connection sections provided on both ends of these wirings, and that is routed between the first sliding plate and the second sliding plate, wherein a wiring lamination section having a plurality of the wirings laminated therein is bent in a U-shape and accommodated in a space section between the first sliding plate and the second sliding plate.

The invention claimed is:

1. A harness-integrated slide hinge comprising:
a first sliding plate;
a second sliding plate;
a sliding mechanism that connects between the first sliding plate and the second sliding plate while allowing them to move relatively; and
a harness routed between the first sliding plate and the second sliding plate including a plurality of wirings and a connection section provided on each end of the harness,
wherein the harness includes a wiring lamination section having the plurality of the wirings laminated therein, and the wiring lamination section is bent in a U-shape when viewed from a direction perpendicular to a plane in which the first sliding plate slides with respect to the second sliding plate and the wiring lamination section is accommodated in a space section between the first sliding plate and the second sliding plate;
the wiring lamination section is positioned so that each of the plurality of the wirings is aligned along a direction perpendicular to a direction in which the first sliding plate and the second sliding plate oppose each other;
the wiring lamination section is bent in a U-shape without twisting; and
an opening section for taking out the connection section is formed in one or both of the first sliding plate and the second sliding plate.

2. The harness-integrated slide hinge according to claim 1, wherein one or both of the first sliding plate and the second sliding plate is formed from a metallic material or a metal containing material.

3. The harness-integrated slide hinge according to claim 1, further comprising a shield member that is provided in one or both of the first sliding plate and the second sliding plate and that is formed from a metallic material or a metal containing material.

4. A sliding-type electronic apparatus comprising:
a plurality of casings having circuits therein are fitted together with the harness-integrated slide hinge according to claim 1 such that they move relatively, and the circuits in the respective casings are electrically connected to each other using said harness-integrated slide hinge.

5. The harness-integrated slide hinge according to claim 1, wherein within the wiring lamination section the respective wirings form a flat cable in which a plurality of micro-coaxial cables arranged parallel to each other are coated and bound together with a resin coating material;
the wiring lamination section is accommodated in the space section so that the respective micro-coaxial cables are arranged adjacent each other along the direction in which the first sliding plate and the second sliding plate oppose each other; and
a plurality of the flat cables are aligned along a direction perpendicular to the direction in which the first sliding plate and the second sliding plate oppose each other.

6. The harness-integrated slide hinge according to claim 5, wherein the resin coating material forms a sheath around the plurality of cables.

7. The harness-integrated slide hinge according to claim 6, wherein the sheath comprises at least two flat side portions.

8. The harness-integrated slide hinge according to claim 6, wherein the micro-coaxial cables include an outer coating.

9. The harness-integrated slide hinge according to claim 6, wherein the outer coating is made of a resin material and the resin material of the outer coating has a melting point higher than the melting point of the resin coating material forming the sheath.

10. The harness-integrated slide hinge according to claim 9, wherein the difference between the melting point of the sheath and the melting point of the outer coating is not less than 30° C.

11. The harness-integrated slide hinge according to claim 6, wherein the sheath comprises at least one of an ultraviolet curing resin, a fluorocarbon resin and ethylene tetrafluoroethylene (ETFE).

* * * * *

UNITED STATES PATENT AND TRADEMARK OFFICE
CERTIFICATE OF CORRECTION

| | |
|---|---|
| PATENT NO. | : 8,169,794 B2 |
| APPLICATION NO. | : 12/775921 |
| DATED | : May 1, 2012 |
| INVENTOR(S) | : Takashi Matsukawa et al. |

It is certified that error appears in the above-identified patent and that said Letters Patent is hereby corrected as shown below:

Title Page, please correct the residences of the third inventor, Tomoyuki SINOHARA and fourth inventor, Shigeru ASHIDA to Tokyo (JP) as referenced on the Declaration filed May 7, 2010.

Signed and Sealed this
Fourth Day of December, 2012

David J. Kappos
*Director of the United States Patent and Trademark Office*